(No Model.)

R. C. ELLRICH.
WRENCH.

No. 584,111. Patented June 8, 1897.

Witnesses
R.W. Detifek
P.J. Egan

Inventor
Robert C. Ellrich,
By James Shepard.
Atty.

THE NORRIS PETERS CO., PHOTO-LITHO., WASHINGTON, D. C.

UNITED STATES PATENT OFFICE.

ROBERT COSMOS ELLRICH, OF SOUTHINGTON, CONNECTICUT, ASSIGNOR TO THE PECK, STOW & WILCOX COMPANY, OF SAME PLACE.

WRENCH.

SPECIFICATION forming part of Letters Patent No. 584,111, dated June 8, 1897.

Application filed October 19, 1896. Serial No. 609,273. (No model.)

*To all whom it may concern:*

Be it known that I, ROBERT COSMOS ELLRICH, a citizen of the United States, residing at Southington, in the county of Hartford and State of Connecticut, have invented certain new and useful Improvements in Wrenches, of which the following is a specification.

My invention relates to improvements in wrenches; and the objects of my improvement are simplicity and economy in construction and efficiency and convenience in operation.

Figure 1:
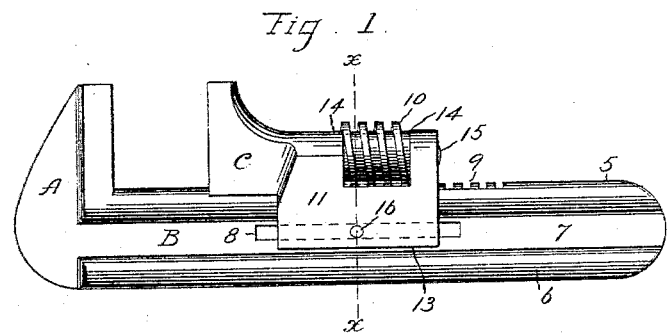
Figure 2:
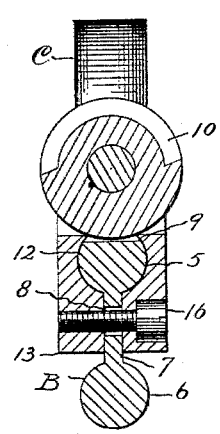
Figure 3:
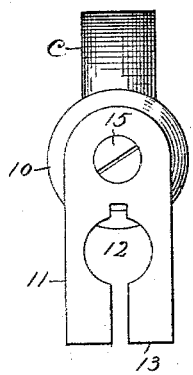
Figure 4:
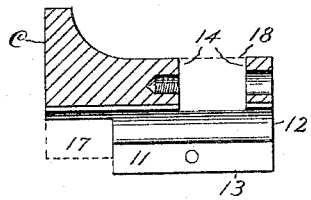

In the accompanying drawings, Figure 1 is a side elevation of my wrench. Fig. 2 is an enlarged transverse section thereof on the line $x\,x$ of Fig. 1. Fig. 3 is a detached end view of the movable jaw and slide, together with the adjusting screw or nut; and Fig. 4 is a central longitudinal section of said movable jaw and slide on the same scale as Fig. 1.

A designates the fixed jaw, which is made integral with the wrench-bar B, said wrench-bar also serving the purpose of a handle. The wrench-bar B is composed of two circular edge portions 5 and 6 and a thin flat web 7, connecting the said two edge portions. The web 7 between said edge portions is of a substantial width with broad flat faces and is slotted longitudinally near the middle of its length, as at 8. The edge portion 5 is toothed, as at 9, to form a rack for being engaged by the threads of the adjusting screw or nut 10. The movable jaw C and slide 11 are formed in one and the same piece, preferably of drop-forged metal. They are bored longitudinally to fit the circular edge 5, while the slide not only extends down over the inner shoulders of said circular edge, but also down by the broad sides of the web 7, so as to bear thereon, the back edge of the slide being longitudinally slotted from its bore 12 to the lower or back edge, as at 13, Fig. 3. The screw or nut 10 rests between shoulders 14 in the slide, where it is pivoted and held in place by the screw 15, the threads of said screw or nut 10 being in engagement with the rack on the wrench-bar, as in ordinary wrenches of this class. A headed screw 16 passes through one side of the slide, through the slot 8 in the wrench-bar, and into a threaded hole in the other side of said slide, as best shown in Fig. 2. The length of the slot 8 and the rack should be such that the headed screw 16 will strike the end of the slot and limit the movement of the slide when moving away from the fixed jaw before the adjusting-screw quite reaches the end of the rack, thereby holding the slide on the wrench-bar without any danger of marring the end of the thread of the adjusting-screw. I may also use the headed screw to tighten up the slide to make it work easy or stiff, as may be desired, by loosening said screw so that the sides of the slide may move easily along the flat sides of the web 7 or tightening up the screw to make them bind thereon. By fitting the slide to the circular edge portion 5 and the flat web no portion of it extends over the back edge of the wrench-bar where it is more or less in the way. The back of the wrench-bar is in one continuous smooth unobstructed edge that can never feel unpleasant to the hand of the user.

In addition to the advantages of my wrench in use my improved construction enables me to produce the wrench at less cost. I form the movable jaw and slide in one solid piece, by drop-forging preferably, of the contour indicated in Fig. 4 by the full broken lines. Then I saw out the slit a little deeper than the part to be bored. I next drill or bore the hole 12 for the circular edge portion 5, and then mill off the corner, (indicated by the broken lines 17, Fig. 4,) and also mill out the space for the nut 10 between the shoulders 14, the broken line 18 indicating the contour before milling. By sawing the slit before boring or drilling the drill will surely follow the slit, so as to bring the bore parallel to the sides of the slide. The oil also readily reaches the drill, and the chips readily work out, so that I can cheaply and accurately drill said hole.

I claim as my invention—

1. A wrench comprising the fixed jaw and wrench-bar having the circular and toothed edge portion 5 and thin flat web 7, the movable jaw and slide bored and slotted longitudinally to fit said edge 5 and web 7 without extending over the back edge 6 of said wrench-bar, and the adjusting screw or nut 10, substantially as described and for the purpose specified.

2. The herein-described wrench consisting of the fixed jaw and wrench-bar having the circular and toothed edge portion 5 and thin flat web 7 having longitudinal slot 8, the movable jaw and slide bearing the adjusting screw or nut and bored and slotted longitudinally to fit said edge and web, and the screw 16 in said slide passing through the said slot 8, substantially as described and for the purpose specified.

ROBERT COSMOS ELLRICH.

Witnesses:
STEPHEN WALKLEY,
E. M. STANNARD.